Patented May 29, 1934

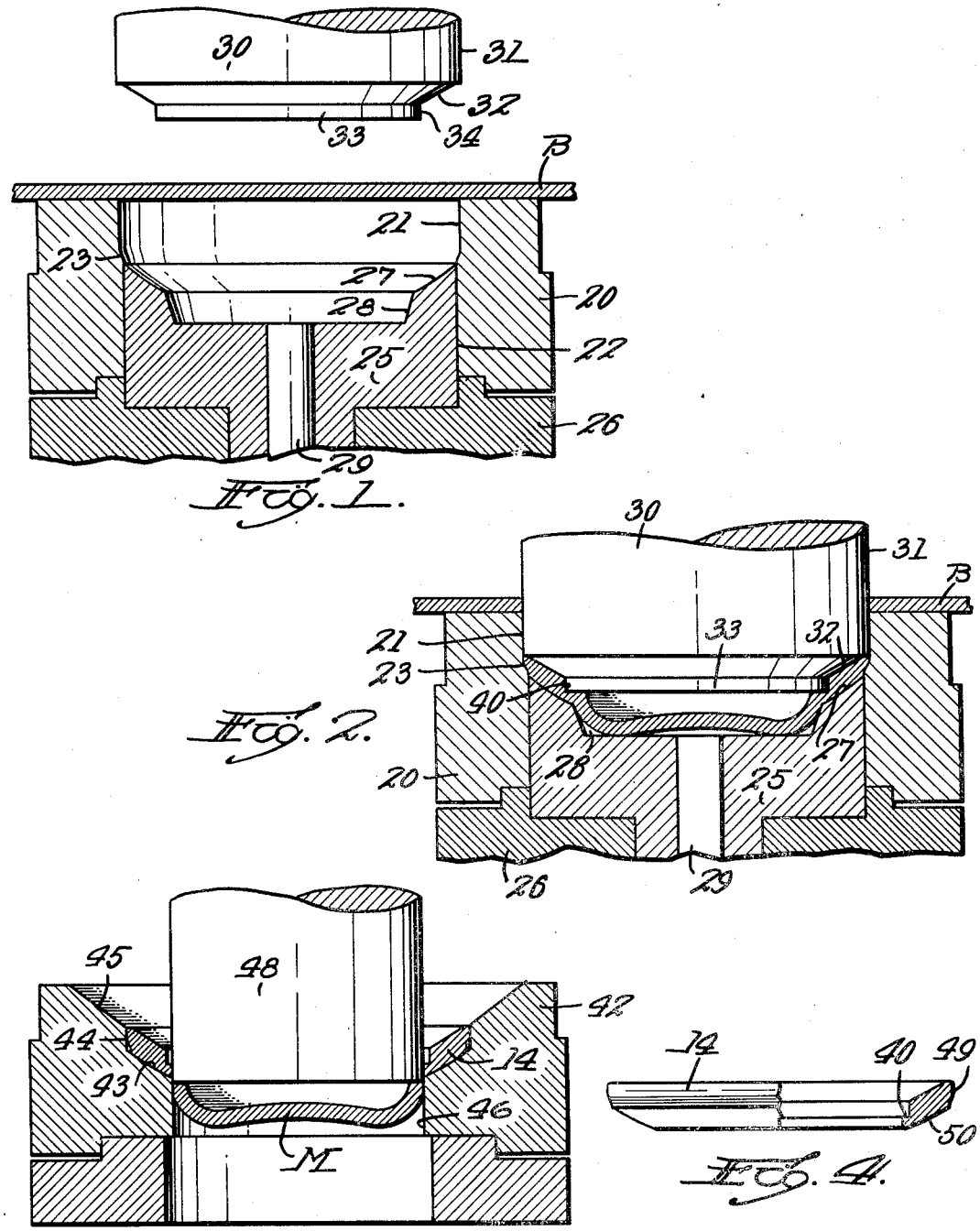

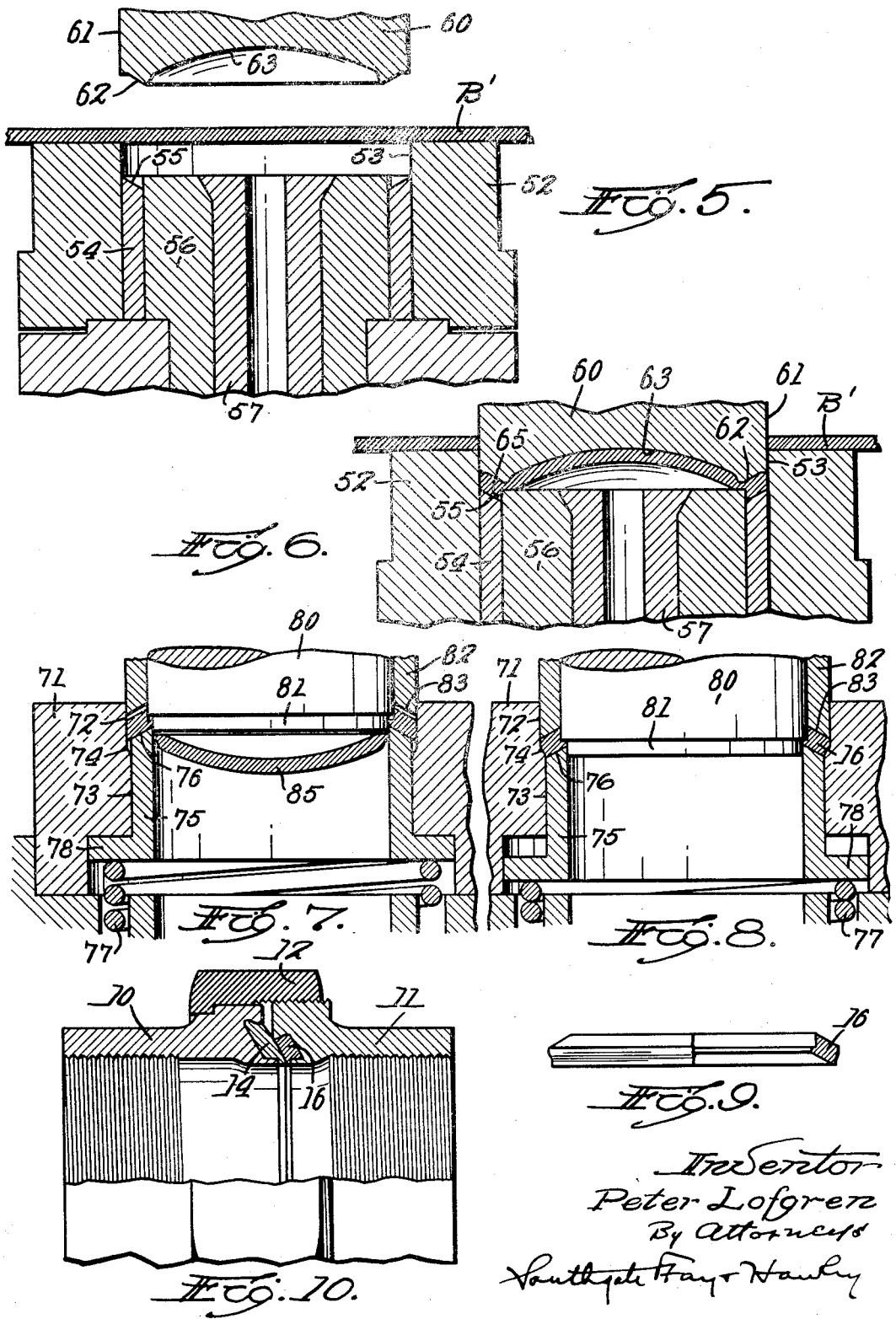

1,960,385

UNITED STATES PATENT OFFICE 1,960,385

METHOD OF MAKING A SEATING RING

Peter Lofgren, Worcester, Mass., assignor to Rockwood Sprinkler Company of Massachusetts, Worcester, Mass., a corporation of Massachusetts Application May 31, 1932, Serial No. 614,396

3 Claims. (Cl. 29—157)

This invention relates to pipe couplings designed for heavy duty and comprising male and female coupling members, each preferably made from a steel forging or stamping. It is customary and desirable to provide such steel coupling members with non-corrosive contacting face elements or seating rings, so that an accurate and close-fitting joint may be maintained.

In certain co-pending applications filed February 6, 1931, Serial No. 514,016 and No. 514,017 I have shown such male and female coupling members having conical end surfaces recessed to receive non-corrosive seating rings, and in my Patent No. 1,905,115, issued to me on an application also filed February 6, 1931, I have shown seating rings especially designed for use in such coupling members.

It is the principal object of my present invention to provide an improved and simplified method of manufacturing the seating rings shown in said co-pending applications.

By the use of this improved method, a seating ring may be produced more quickly and easily, with fewer operations and with reduced costs.

My invention further relates to certain apparatus by which my improved method may be carried out, which aparatus will be hereinafter described and more particularly pointed out in the appended claims.

A preferred form of the invention is shown in the drawings, in which

Fig. 1 is a sectional elevation of a set of dies adapted for performing the first operation in making a male seating ring;

Fig. 2 is a similar view, showing the position of the parts at the end of the first operation;

Fig. 3 is a sectional elevation of a set of dies adapted for performing the second or finishing operation on the male seating ring;

Fig. 4 is a side elevation of the male ring, partly in section;

Fig. 5 is a sectional elevation of a set of dies adapted to perform the first operation in making a female seating ring;

Fig. 6 shows the same parts at the end of the first operation;

Fig. 7 is a sectional elevation of dies adapted to perform the second operation in making a female seating ring;

Fig. 8 is a similar view, showing the position of the parts at the end of the second operation;

Fig. 9 is a side elevation, partly in section, of the female ring, and

Fig. 10 is a partial sectional side view of a complete pipe coupling embodying my invention.

Referring to Fig. 10, it will be seen that my invention relates to a pipe coupling comprising a male coupling member 10, a female coupling member 11, a nut 12, a male seating ring 14, and a female seating ring 16. The seating rings are secured in recesses in the abutting faces of the coupling members 10 and 11, and are so positioned that only these non-corrosive rings are in contact when the coupling is in use.

As previously stated, the coupling members and the method of making the same, and also the seating rings as articles of manufacture are covered by my co-pending applications, while the present aplication relates specifically to an improved and simplified method of making seating rings such as 14 and 16, and to improved apparatus for use in practicing said method.

Referring to Figs. 1 to 4, I will first describe the method of making the male seating ring 14. The first operation is indicated in Figs. 1 and 2 and is preferably performed by the set of dies disclosed in said figures.

The lower die comprises a ring 20 having an upper cylindrical opening 21, a lower cylindrical opening 22 and a downwardly contracted intermediate portion 23. An inner die member or anvil 25 is firmly mounted in the base 26 which supports the ring 20, and is provided with an inwardly and downwardly inclined upper surface 27 and with a central recess 28 and an axial opening 29.

The upper die or plunger 30 comprises a cylindrical portion 31, a downwardly beveled or conical portion 32, and a central projection 33 surrounded by an abrupt shoulder 34.

A blank B is placed over the lower die ring 20 as shown in Fig. 1, and the upper die or plunger 30 is then forced down to the position indicated in Fig. 2. During this press operation, the central projection 33 of the upper die first engages a middle portion of the blank B and forces the blank downward in cup-shape into the cylindrical opening 21. The sharp edge of the cylindrical portion 31 of the upper die or plunger 30 then severs the blank along the periphery of the cylindrical opening 21 in the lower die, and the plunger 30 then forces the blank downward into engagement with the inverted concave conical surface 27 of the anvil 25 and also into the contracted intermediate portion 23 of the ring 20. The shoulder 34 of the projection 33 is forced firmly into the several blanks and produces a shouldered recess 40 in the upper surface of the blank, while the middle portion of the blank assumes the indicated position in the anvil recess 28 previously described.

The partially formed seating ring is then removed from the lower die in any convenient manner, as by raising the anvil 25, and the blank is then placed in the second set of dies which are shown in Fig. 3. The lower die 42 has a concave conical surface 43 to support the partially formed ring or blank, and has a cylindrical side wall 44 to center the blank, as well as a concave conical upper surface 45 to facilitate the centering of the blank within the side wall 44. The die 42 has a central opening 46 of substantially the same diameter as the upper die or plunger 48, which is moved downward to sever the middle portion M of the blank along a line spaced slightly inwardly from the vertical wall of the shouldered recess 40.

By this second operation a complete male seating ring 14 is provided, as shown in Fig. 4, having upper and lower conical surfaces, a shouldered recess 40 in its inner edge and an upwardly and outwardly expanded outer edge portion 49. The lower or convex conical surface 50 is the engaging surface when the blank is seated in its coupling member 10, as clearly appears in Fig. 10.

Referring to Figs. 5 to 9, a somewhat similar procedure is followed in the production of the female seating ring 16. For the first operation I provide a pair of dies as shown in Figs. 5 and 6. The lower die comprises an outer ring 52 having a cylindrical opening 53, a sleeve or bushing 54 having an inwardly and downwardly beveled upper surface 55, and an anvil 56 projecting above the lower edge of the inclined surface 55.

An ejecting member 57 may be mounted in a central opening of the anvil 56. The upper die or plunger 60 has a cylindrical outer wall 61, a substantially V-shaped projection 62 and an upwardly arched central recess 63.

A blank B' is placed on the lower die or ring 52 and the upper die or plunger 60 then descends to the position shown in Fig. 6. The blank is first severed around the periphery of the opening 53 and is then forced downward against the concave conical surface 55 of the sleeve 54 and also against the upper outer corner of the anvil 56. It will be understood that the ring 52, sleeve 54 and anvil 56 are all firmly seated on a base 58.

As the blank B' is forced downward to the position shown in Fig. 6, the corner of the anvil 56 produces a shouldered recess 65 in the under surface of the blank, while the V-shaped projection 62 forces the blank firmly against the upper corner of the anvil and also produces a V-shaped annular groove in the upper surface of the blank. During this operation, the middle portion of the blank has a marked tendency to spring or arch upward into the recess 63 of the upper die or plunger 60.

The partially formed blank is then removed from the lower die or ring 52 by the use of the ejector 57 and is placed in inverted position in the lower die of the set used in the second or finished operation.

This lower die comprises a ring 71 having an upper cylindrical opening 72, a lower cylindrical opening 73 and an inwardly contracted connecting portion 74. A sleeve or bushing 75 is mounted within the inner cylindrical opening 73 and is provided with a downwardly beveled upper surface 76.

The sleeve or bushing 75 is slidable in the lower opening 73 of the ring 71 and is normally held in the raised position shown in Fig. 7 by a heavy coil spring 77. A flange 78 on the lower end of the bushing 75 acts as a stop.

The upper die or plunger used in the second operation comprises a cylindrical plunger 80 having a shouldered downward cylindrical projection 81. The plunger is also provided with an outer sleeve 82 having an upwardly and inwardly beveled or conical lower face 83. The plunger 80 and sleeve 82 are firmly secured against relative axial movement during operative movement thereof.

As the plunger 80 descends, the shouldered projection 81 severs the middle portion 85 of the blank, which is thereafter ejected through the opening in the sleeve or bushing 75. The spring 77 is heavy enough to hold the sleeve 75 raised during this cutting operation.

The plunger 80 and sleeve 82 continue to move downward and apply heavy pressure to the upper surface of the partially formed ring, forcing the ring downward, together with the supporting sleeve 75. The outer edge of the ring is forced into the contracted portion 74 of the lower die and is contracted in its outer lower portion, being thus brought to the finished outline or section indicated in Fig. 8. The shoulder of the plunger 80 corrects any deformation of the lip formed by the shearing and removal of the center.

After the rings 14 and 16 are thus formed, they are firmly secured in the coupling members 10 and 11, preferably by press operation described in detail in my prior applications.

It will thus appear that I have provided new and simplified methods of producing male and female seating rings, each by two successive press operations and that I have provided novel apparatus by which said operations may be conveniently performed.

Having thus described my invention and the advantages thereof, I do not wish to be limited to the details herein disclosed, otherwise than as set forth in the claims, but what I claim is:—

1. The method of making a seating ring which consists in forming a ring blank with substantially parallel conical surfaces, forming a shouldered recess near the inner edge of one conical surface of said ring and spaced substantially from the bottom of said blank, providing said ring with an outer edge portion contracted toward the other conical surface thereof, and thereafter severing and removing the inner portion of said ring along a line slightly spaced inward from the apex of said shouldered recess.

2. The method of making a seating ring which consists in forming a ring blank with substantially parallel conical surfaces, forming a shouldered recess near the inner edge of the concave conical surface of said ring and spaced substantially from the bottom of said blank, providing said ring with an outer edge portion contracted toward the convex conical surface of said ring, and thereafter severing and removing the inner portion of said ring along a line slightly spaced inward from the apex of said shouldered recess.

3. The method of making a seating ring which consists in forming a ring blank with substantially parallel conical surfaces, forming a shouldered recess near the inner edge of the convex conical surface of said ring and spaced substantially from the bottom of said blank, providing said ring with an outer edge portion contracted toward the concave conical surface of said ring, and thereafter severing and removing the inner portion of said ring along a line slightly spaced inward from the apex of said shouldered recess.

PETER LOFGREN.